United States Patent [19]

Anderson

[11] 4,270,716

[45] Jun. 2, 1981

[54] TRANSIT VEHICLE SPEED CONTROL APPARATUS AND METHOD

[75] Inventor: Larry W. Anderson, West Mifflin, Pa.

[73] Assignee: Westinghouse Electric Corp., Pittsburgh, Pa.

[21] Appl. No.: 25,512

[22] Filed: Mar. 30, 1979

[51] Int. Cl.³ .............................................. B61L 3/06
[52] U.S. Cl. ............................ 246/182 B; 246/187 B; 364/426
[58] Field of Search ........... 246/182 B, 187 B, 182 C, 246/63 C, 63 R; 364/426, 424

[56] References Cited

U.S. PATENT DOCUMENTS

| 3,363,096 | 1/1968 | Hughson et al. | 246/182 B |
|---|---|---|---|
| 3,519,805 | 7/1970 | Thorne-Booth | 246/182 B |
| 3,749,994 | 7/1973 | Matty | 318/563 |
| 3,974,992 | 8/1976 | Matty | 246/182 B |
| 4,005,837 | 2/1977 | Grundy | 246/182 B |
| 4,005,838 | 2/1977 | Grundy | 246/182 B |
| 4,015,082 | 3/1977 | Matty et al. | 178/66 R |

FOREIGN PATENT DOCUMENTS 2370318  6/1978  France .
2382043  9/1978  France .

Primary Examiner—William H. Beha, Jr.
Assistant Examiner—Reinhard J. Eisenzopf
Attorney, Agent, or Firm—R. G. Brodahl

[57] ABSTRACT

There is disclosed a passenger transit vehicle speed maintaining control apparatus and method, including an open loop acceleration control that is operationally modified by a closed loop speed control, for providing an improved control of vehicle speed in relation to a change of input speed command.

12 Claims, 11 Drawing Figures

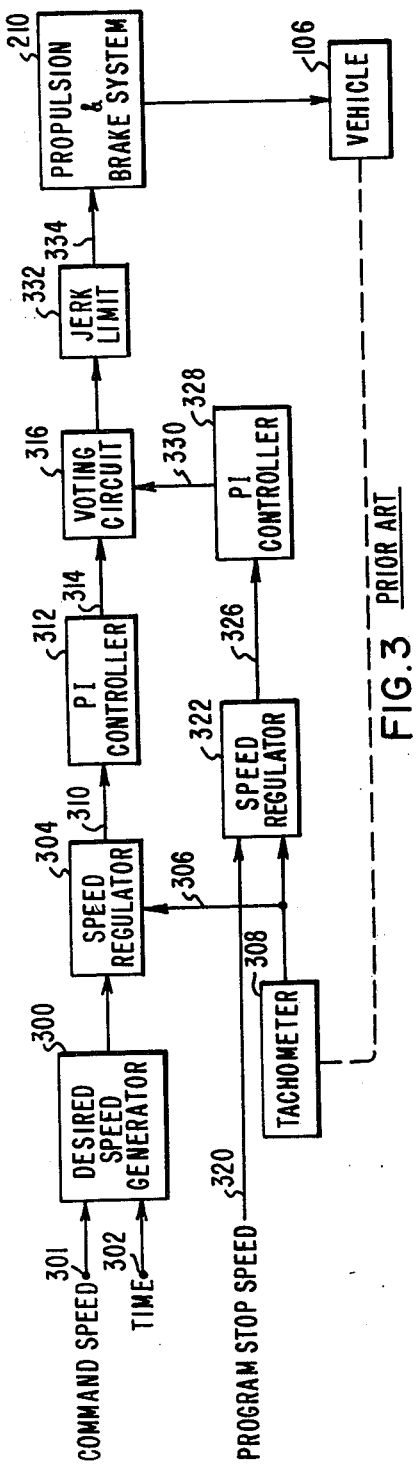
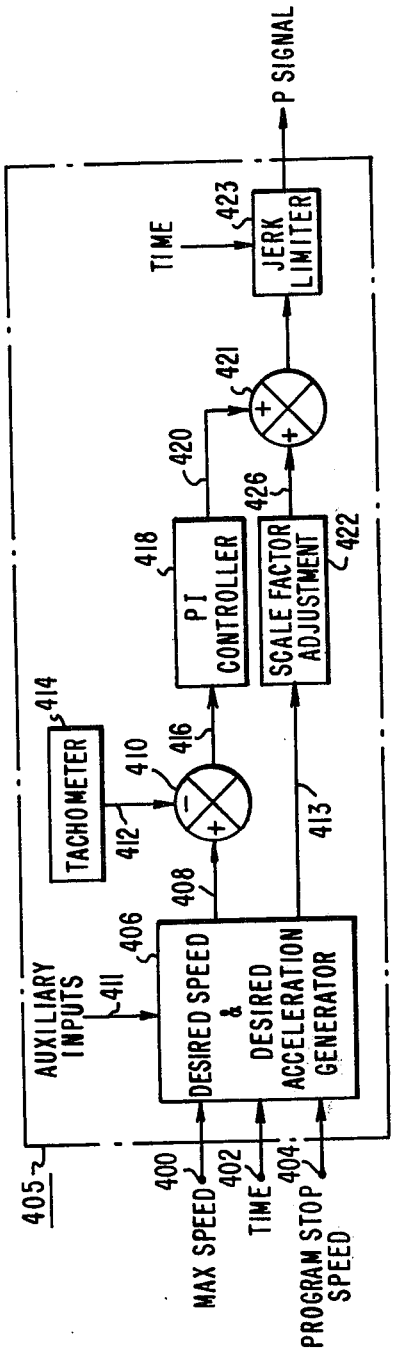
FIG. 3 PRIOR ART
FIG. 4

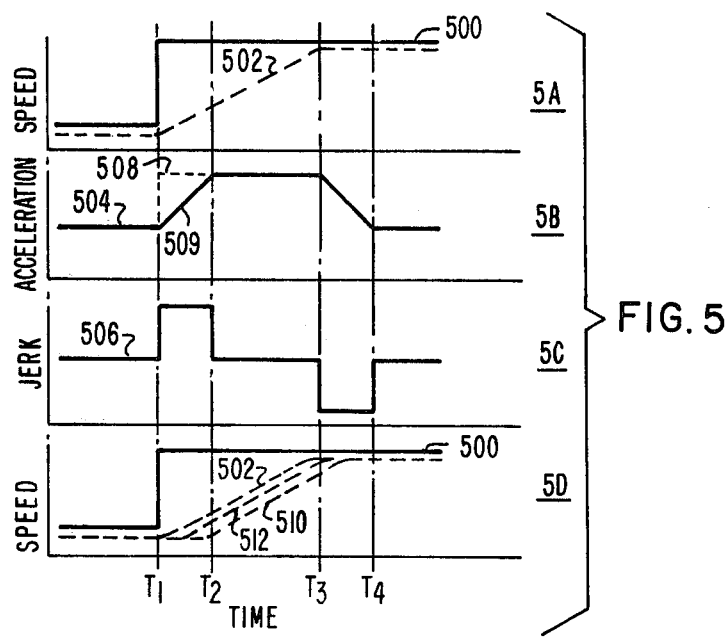
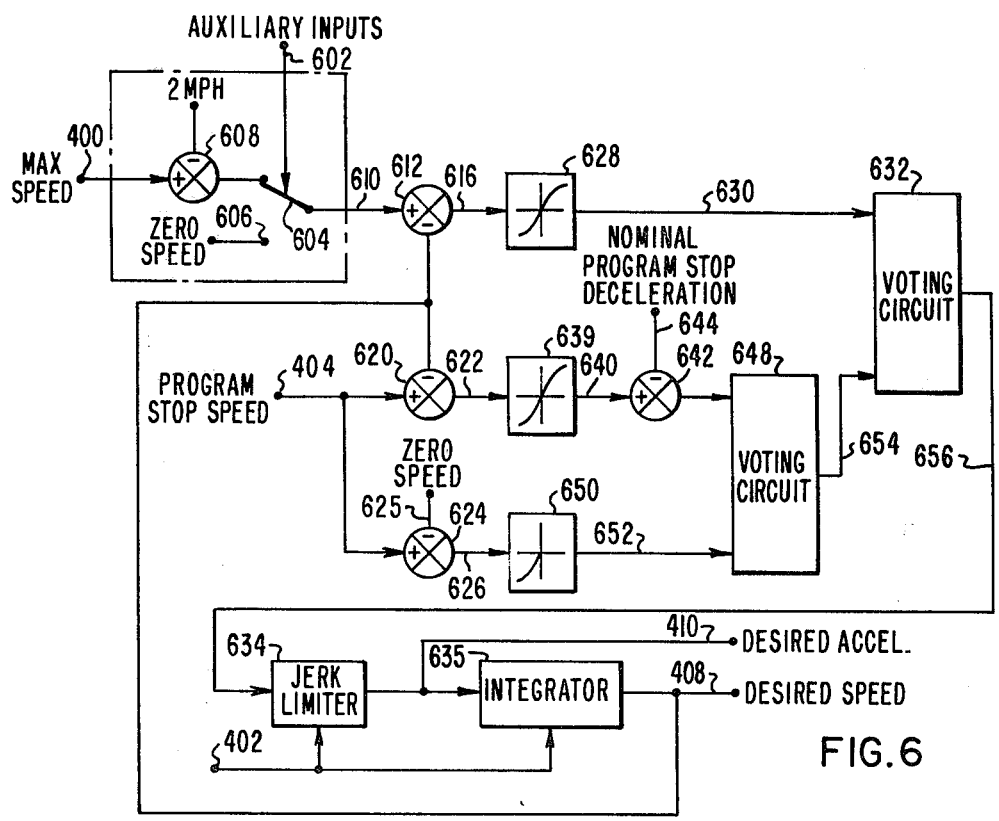

TRANSIT VEHICLE SPEED CONTROL APPARATUS AND METHOD

CROSS REFERENCE TO RELATED APPLICATION

The present application is related to a patent application Ser. No. 920,319 that was filed June 28, 1978 by L. W. Anderson and Arun P. Sahasrabudhe and entitled "Speed Maintaining Control of Train Vehicles", and which is assigned to the same assignee as the present invention.

BACKGROUND OF THE INVENTION

It is known in the prior art to control the speed of a transit vehicle moving along a roadway track in response to a decoded input speed command signal received by the vehicle from the wayside apparatus through operation of vehicle carried antennas coupled with the input speed command information provided within a particular signal block of the roadway track, such as disclosed in an article entitled The BARTO Train Control System that was published in Railway Signaling and Communications for December 1967 at pages 18 to 23. A maximum safe input speed command signal is provided for each track circuit signal block and the vehicle responds to this input speed command signal. In addition for stopping the vehicle in each passenger station adjacent to such passenger station a program stop antenna is positioned and has predetermined transposed portions to provide position intelligence count signals to the vehicle as determined by the movement of the vehicle along the program stop antenna for controlling a precise stop of the vehicle in relation to the passenger doors at the station platform. A vehicle carried program stop apparatus controls the vehicle to bring it to a desired program stop in relation to the station platform, such as disclosed in an article entitled "Automatic Train Control Concepts Are Implemented By Modern Equipment" that was published in the Westinghouse Engineer for September 1972 at pages 145 to 151.

It is known to provide a vehicle with a speed maintaining control apparatus which responds to an input speed command signal from the track wayside in relation to an actual speed signal from the vehicle tachometers as disclosed in an article entitled "Sao Paulo Metro E-W Line Innovations" that was published at pages 1105 to 1109 in the Conference Record of the Twelfth Annual Meeting of the IEEE Industry Applications Society in Los Angeles, October 1977. In the absence of a program stop signal, the vehicle speed is controlled to follow the speed command or requested velocity signal with a predetermined margin of approximately two miles per hour below this velocity. The speed maintaining control also determines the acceleration rate and jerk limit rate of the vehicle in response to a change in the requested velocity signal.

A general description of the Intel 8080 microprocessor and related peripheral devices is provided in the intel 8080 Microcomputer Systems Users Manual currently available from Intel Corp., Santa Clara, Calif. 95051.

SUMMARY OF THE INVENTION

An open loop acceleration control for a transit vehicle is provided, which includes an open loop acceleration controller providing a desired acceleration signal modified by a closed loop speed control providing a desired speed signal. When the vehicle is responding to a steady input speed command signal from the track signal block, the speed maintaining operation controls the vehicle in accordance with the desired speed signal and the desired acceleration signal is zero. When a change of input speed command signal occurs then the desired acceleration signal as modified by a comparison of a desired speed signal with the vehicle actual speed signal controls the vehicle as the vehicle changes from the old input speed command and until it is operating on the new steady input speed command.

BRIEF DESCRIPTION OF THE DRAWINGS

FIG. 3 shows the functional operation of a prior art speed maintaining control apparatus for a transit vehicle;

FIG. 4 shows the speed maintaining control apparatus for the present invention;

FIG. 5 shows curves to illustrate the improved speed maintaining control provided by the present invention;

FIG. 6 shows the desired speed and desired acceleration signal generator of FIG. 4;

DESCRIPTION OF THE PREFERRED EMBODIMENT

Figure 1:
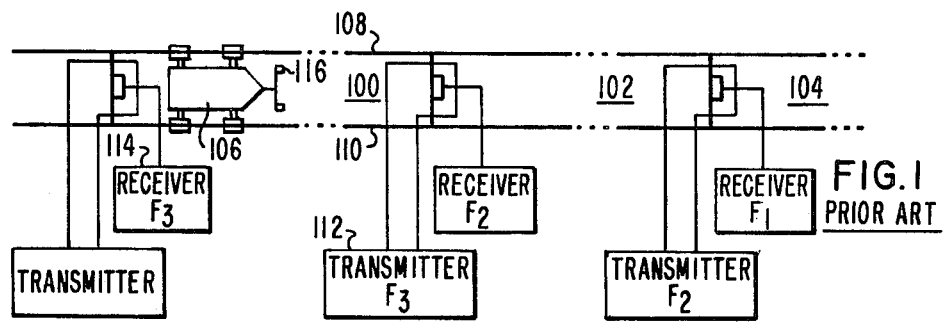
FIG. 1 shows a prior art track signal block arrangement for controlling the operation of a transit vehicle.

In FIG. 1 there is shown a prior art transit vehicle control signal block arrangement whereby an individual desired speed command signal is transmitted to each of successive track signal blocks 100, 102, 104 and so forth. A transit vehicle 106 is shown within signal block 100 as it moves along the track rails 108 and 110. The vehicle 106 will electrically prevent the speed command signal from transmitter 112 operative with the occupied signal block 100 from reaching the associated signal receiver 114 for the purpose of detecting a vehicle occupancy within the signal block 100.

Figure 2:
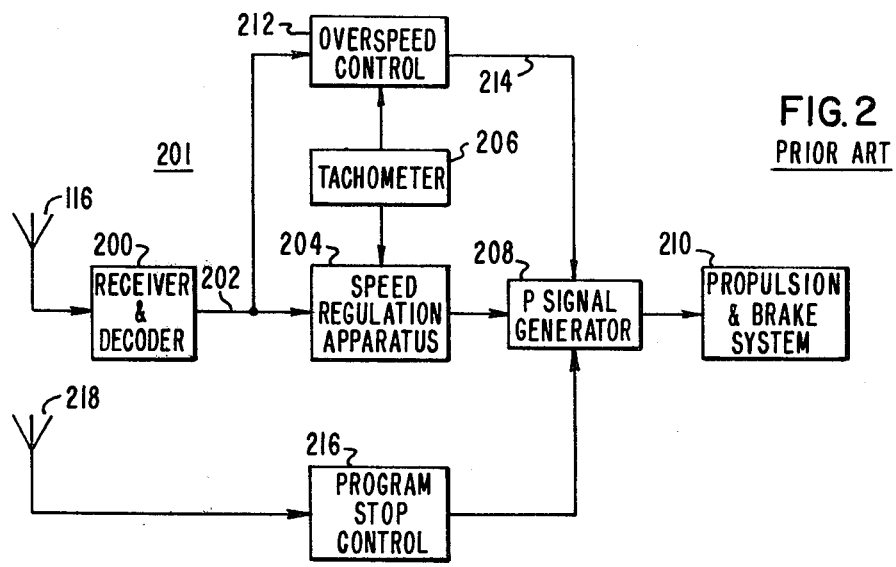
FIG. 2 shows a prior art vehicle carried speed control apparatus for determining the movement speed of a transit vehicle along a roadway track.

In FIG. 2 there is shown a prior art speed control apparatus 201 carried by the transit vehicle 106 of FIG. 1. The speed control apparatus 201 determines the movement speed of the transmit vehicle 106 along the track rails 108 and 110. Each signal block has an input speed command signal and the track signal antennas 116, carried by the vehicle 106 as shown in FIG. 1, provides this input speed command signal to a receiver and decoder 200 which provides the input speed command at output 202. The speed regulation apparatus 204 compares the input speed command from output 202 with the vehicle actual speed from tachometer 206 for providing a speed error to the P signal generator 208, which then provides the tractive effort request P signal to the propulsion and brake system 210 for controlling the propulsion and brake operation of the vehicle. A safety overspeed control 212 responds to the input speed command at output 202 and compares it in a failsafe manner with the vehicle actual speed from tachometer 206 for providing an enable signal 214 which enables the P signal generator to respond to the speed error input from the speed regulation apparatus 204. A program stop control 216 responds to program stop control signals provided from a transposed cable positioned along the roadway track adjacent to a passenger station and sensed by a vehicle carried antenna 218 for determining the operation of the P signal generator 208 to control the program stop speed of the transit vehicle, and thereby the stopping position of the vehicle, in relation to the passenger station.

In FIG. 3 there is shown a prior art speed maintaining control system such as is presently operative at the Seattle and Tacoma Airport and described in an article published in the Westinghouse Engineer for January 1971 at pages 8 to 14. The speed control apparatus includes a desired speed generator 300, which can respond to the input speed command signal at input 301. The particular application at the Seattle and Tacoma Airport responded to a go or no go input speed command signal. A time input 302 is supplied from a suitable clock time device. The desired speed generator 300 provides a target or desired speed signal to the speed regulator 304 which also responds to the actual vehicle speed 306 from a tachometer 308. A speed error signal 310 is provided to a well-known PI controller 312, including a proportional operation and an integral operation which provides a tractive effort request signal 314 to a voting circuit 316. A program stop antenna, providing phase shifted signals to a receiver and position determining apparatus determines a desired program stop speed signal 320 to the program stop speed regulator 322 for comparison with the vehicle actual speed from the tachometer 308. A program stop speed error signal 326 goes to a PI controller 328 and the program stop tractive effort request signal 330 is applied to a second input of the voting circuit 316. The voting circuit 316 picks the one of the input speed signals 314 and 330 which calls for the less tractive propulsion power or more brake of the controlled vehicle. The jerk limit 332 assures passenger comfort in relation to any change in the input speed command from the track signal block. The well-known tractive effort request P signal 334 is output to the propulsion and brake system 210 operative with the motors and brakes of the vehicle 106. The speed maintaining control system shown in FIG. 3 has two closed speed control loops which must be compensated in relation to each other.

In FIG. 4 there is shown the speed maintaining control apparatus of the present invention. The absolute maximun safe speed input 400 represents the vehicle input speed command from the track signal block occupied by the vehicle. Time input 402 is from a suitable clock device. The program stop speed input 404 is provided only when the vehicle is passing over an energized program stop transposed cable in the vicinity of a passenger station where it is desired for the vehicle to stop. The desired speed and desired acceleration generator 406 provides a desired speed signal 408 and a desired acceleration signal 413. The auxiliary inputs 411 can include, for example, a zero speed when the vehicle doors are open in a station or when the emergency spring brakes are applied. In addition, if the overspeed relay is dropped or when manual control by the operator is selected this input 411 will be zero. The speed regulator 410 compares the desired speed signal 408 with the vehicle actual speed 412 from tachometer 414. The resulting speed error signal 416 goes to a proportional plus integral or PI controller 418 and is applied as control speed signal 420 to one input of the summing device 421. The desired acceleration signal 413 is applied to a scale factor adjustment circuit 422 and then the adjusted acceleration control signal 426 goes to the summing device 421 to smooth any transition between requested input speed command changes for providing acceleration or deceleration limits independent of the track grade. When the vehicle is actually traveling in response to the speed control signal 420 during a speed maintaining operation, and without a change in the input speed command from the occupied track signal block, then the acceleration control signal 426 should be zero. On the other hand when a previous input speed command was 15 miles per hour and an input speed command change occurs to a new input speed command of 27 miles per hour, then a maximum acceleration rate of about 2 or 2½ miles per hour per second is provided by the acceleration control signal 426, with a smooth acceleration ramp having jerk limited rounded corners is provided by the jerk limiter 423.

In FIG. 5A there is shown in curve 500 an input speed command change from a previous speed command of, for example, 15 miles per hour to a new speed command of 27 miles per hour, assuming there is no program stop speed signal in operation. The dotted curve 502 shows the desired speed which is determined to be about 2 miles per hour below the input speed command. In FIG. 5B, the curve 504 shows the desired acceleration which is zero during the unchanged input speed command of 15 miles per hour and which increases at a jerk limited rate to the established maximum of about 2 or 2½ miles per hour per second. In FIG. 5C, the provided jerk limit at time T1 is shown by the curve 506 which establishes a limited rate of change for the comfort of the vehicle passengers. The desired acceleration 504 beginning at time T1 increases at a constant slope until time T2 as the integration of the jerk limit 506. The desired speed 502 is at a constant slope and follows the constant acceleration from time T2 until time T3. At the time T3 the desired speed 502 should blend into a predetermined difference below the input speed command 500, so the jerk limit 506 goes negative at time T3 and the desired acceleration 504 decreases at a constant slope until time T4 when the jerk limit 506 and the desired acceleration 504 both become zero and the desired speed 502 is again about 2 mile per hour below the input command speed 500. This predetermined difference of 2 miles per hour is provided to keep from tripping the overspeed vital control 212 shown in FIG. 2 and thereby removing the P signal enable 214, and which is done by knowing the permitted jerk rate and the maximum acceleration to determine when time T3 should occur in relation to the desired speed difference condition at time T4. The desired acceleration curve 504 could in theory go to the maximum acceleration value at time T1 as shown by the dotted curve portion 508, but it is required to have a limited rate of change in accordance with the curve 506 and for this purpose in effect an integration of the desired acceleration 504 is provided to obtain the desired speed 502. The desired acceleration 504 is multiplied by a scale factor to determine the desired P signal since that is the desired acceleration desired for the vehicle to follow, however, the actual vehicle is not perfect in response to the desired acceleration and there is no convient way to reliably measure the vehicle actual acceleration so that the actual speed is compared with the desired speed to determine a speed error which goes through a PI controller 418 to correct for track grades, passenger weight differences, and the actual vehicle operational differences. The P signal is generated in response to the acceleration control signal 426 as modified by how well the vehicle is following the speed control signal 420.

In FIG. 5D, the input speed command curve 500 is shown in relation to the command desired speed curve 502 for illustrating the improved actual vehicle speed control response provided by the present invention. The curve 510 illustrates the vehicle actual speed provided by the prior art speed control apparatus shown in FIG. 3 in response to an input speed command change as shown by curve 500. The curve 512 illustrates the improved vehicle actual speed provided by the speed control apparatus of FIG. 4 in response to this same input speed command change as shown by curve 500. With the speed control apparatus of FIG. 4, an ideal vehicle on a level track would follow the command desired speed curve 502, but in real time practice the actual vehicle 106 is not such an ideal vehicle. The curve 512 shows how the present speed control apparatus of FIG. 4 will follow the curve 502 with a lesser amount of lag than did the prior art speed control apparatus of FIG. 3. The curve 512 shows a better control of vehicle actual speed and permits operation closer to the overspeed limit with fewer overspeed disenablings because of lag change behind the curve 502 on particularly a decrease change in the input speed command.

The present speed control apparatus as shown in FIG. 4 establishes a desired acceleration 413 and provides this desired acceleration 413 as an input to an open loop acceleration control apparatus with a modification of that desired acceleration based upon a closed loop speed control that responds to what the vehicle is actually doing. Since the actual vehicle is not a perfect vehicle but instead has different individual vehicle operational characteristics, wind resistance, rolling friction, different tract grades and the like to contend with the closed loop makes vernier small changes to compensate for these differences. This closed loop has to be compensated and the scale factor of the open loop has to be adjusted to provide a good match between the P signal scaling and the desired acceleration scaling in accordance with the curves 502 and 504 shown in FIG. 5. The correct desired acceleration is established, and integrating that desired acceleration determines the correct desired speed for the vehicle.

In FIG. 6 there is shown the desired speed and desired acceleration generator of FIG. 4. The maximum safe input speed command for the occupied signal block is obtained from the speed decoding apparatus and is supplied at input 400. If an auxiliary is present, it is supplied at input 602 and in effect applies in maximum command speed of zero as indicated by the switch 604 which is then connected with contact 606. Otherwise the maximum safe input speed command at input 400 is reduced by 2 miles per hour in difference device 608 and is supplied to output 610 where it is applied to difference device 612. The output desired speed 408 is applied to the other input and subtracted from the maximum input speed command 610 to develop a first difference speed 616. If there is a program stop speed signal at input 404, this is applied to difference device 620 where the desired speed 408 is subtracted to develop a second difference speed 622. The program stop speed signal 404 is also applied to difference device 624 where a zero speed is subtracted to develop a third difference speed 626. The first difference speed 616 is used as an address for a first look up table 628 that is stored in the memory of the digital microprocessor 405 shown in FIG. 4, such that for a certain amount of first difference speed either positive or negative, the look up table 628 provides a maximum first acceleration 630 to the voting circuit 632. If there is no program stop at input 404 at this time, the voting circuit 632 picks the less positive or more negative acceleration and this would be the first acceleration 630 which then would go to the jerk limiter 634 for determining the desired acceleration 410.

When there is a program stop speed at input 404, the device 620 determines the program stop second difference speed 622 as the difference between the program stop speed at 404 and the desired speed 408. The program stop second difference speed 622 is used as an address for a second look up table 639 to determine a second acceleration 640. When this program stop second difference speed is zero the vehicle should still be decelerating since the program stop speed at input 404 is not a constant but is decreasing at its own deceleration rate of about 2 miles per hour per second until the vehicle is actually stopped at the passenger station. Thusly, a nominal program stop rate deceleration is desired, so at difference device 642 a predetermined nominal program stop deceleration 644 is subtracted from the second acceleration rate 640 to give the second maximum acceleration 646 to the voting circuit 648, which second maximum acceleration 646 should be followed to provide the desired program stop velocity changes.

Figure 7:
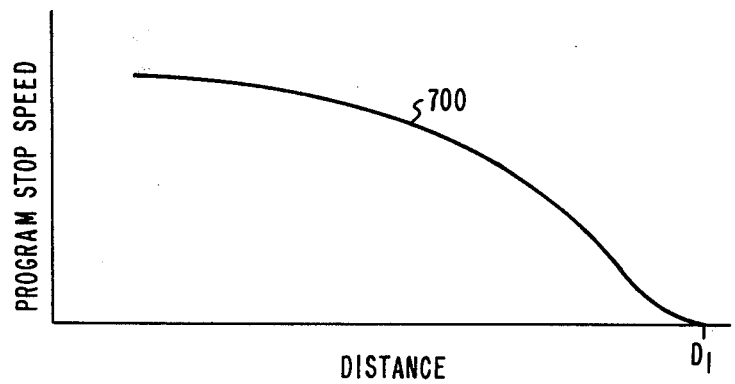
FIG. 7 shows desired program speed versus distance curve.

The look up table 628 as compared to the look up table 639 has a different function to perform. When the speed error 616 is zero and if the input speed command 400 is constant at the zero slope, a zero first acceleration 630 is desired since the function here is to speed maintain the vehicle in relation to that constant input speed command 400. When the feedback desired speed 408 is slightly below the input speed command 400, the resulting positive first difference speed 616 should provide a small positive first acceleration 630 and if the feedback desired speed 408 is considerably below the input speed command 400, the resulting first difference speed 616 should provide a larger positive first acceleration 630 up to some maximum value of 2 or $2\frac{1}{2}$ miles per hour per second. It has been established that the required first acceleration 630 to get through the jerk limiter 634 and to correct the difference is proportional to the square root of the vehicle speed, so that look up table 628 is determined in relation to the square root of input speed command up to the maximum permitted acceleration. When the speed command is corrected to reduce the first difference speed 616 to zero then a zero first acceleration 630 is desired out of the look up table 628. However, the program stop input speed 404 has a known negative slope as shown in the curve of FIG. 7 since the function now is to provide a predetermined reduction of the vehicle speed to a zero speed condition at the passenger station platform at the vehicle stop distance location D. If the same look up table values are used for each of the look up tables 628 and 639, when the desired speed 408 is the same as the program stop speed 404 to give a second difference speed 622 of zero then the negative slope of the program stop speed curve can be provided by subtracting the desired nominal program stop deceleration at difference device 642. Therefore if a nominal program stop deceleration of $2\frac{1}{2}$ miles per hour is desired, when the second difference speed 622 is zero to result in a second acceleration 640 of zero, the modified second acceleration 646 will be a negative acceleration of $2\frac{1}{2}$ miles per hour per second.

As shown by the desired program stop speed curves 700 of FIG. 7, a flare out at the end of the curve 700 is desired to make a smooth stop for passenger comfort. The control loop, including the difference device 624 is provided for this purpose. The look up table 650 is different than the other two look up tables 628 and 639 because the vehicle is somewhat sluggish in responding to small speed errors and it is desired that the jerk limit on the program stop acceleration characteristic should flare out less than the normally provided jerk limit in an effort to improve the provided speed control at very low vehicle speeds. By specifying the program stop flare out jerk rate to be lower than the normal jerk rate, this provides an improved actual program stop speed curve in accordance with the curve 700 down to a zero speed at the station platform. The look up table 650 is established using this lower jerk rate and compares a zero speed input 625 with the input program stop speed 404 to develop a third maximum acceleration 652. The voting circuit 648 determines the less brake or the greater acceleration of the vehicle by selecting the more positive or less negative of the second acceleration 646 and the third acceleration 652 to develop a fourth maximum acceleration 654. The voting circuit 632 determines the greater brake or the less acceleration of the vehicle by selecting the less positive or the more negative of the first acceleration 630 and the fourth acceleration 654. The fifth acceleration output 656 of the voting circuit 632 is then applied to the jerk limiter 634. Thusly, the fifth acceleration 656 responds to the maximum input speed command 400 from the track signal block when the maximum input speed command 400 is lower than the program stop speed 404 and the fifth acceleration 656 responds to the program stop speed 404 when the program stop speed 404 is lower than the maximum input speed command 400. The fifth acceleration 656 would provide the acceleration curve 504 shown in FIG. 5 and including the dotted portion 508 while the jerk limiter 634 is provided to cause the desired acceleration 413 to correspond with the acceleration curve 504 including the portion 509 with a jerk limited rate of change. The jerk limiter 634 has an operational time characteristic input 402 provided. If the actual vehicle moving along the roadway track behaved like a perfect and ideal vehicle, the desired acceleration 413 could control the vehicle to follow the desired speed 408 without the need for the closed loop speed control shown in FIG. 4 and including the difference device 410 and PI controller 418. However, the actual vehicle has friction losses and the roadway track has grades so the closed loop speed control shown in FIG. 4 is needed to modify the desired acceleration 413 to correct the vehicle operation for these real time difference characteristics. The integrator 635 responds to the desired acceleration signal 413 for providing the desired speed signal 408.

In FIGS. 8A, 8B, 8C and 8D there is shown the computer program flow chart for the speed control apparatus of the present invention. In the parameter determining flow chart shown in FIGS. 8A and 8B, at block 800 a check is made to see if an emergency operation speed code is provided an if so at block 802 the variables RAMPS, ACC1, and JERK 1 are set equal to zero and the program exits to the second half flow chart shown in FIG. 8C. If no emergency speed code is provided at block 800, at block 804 a check is made to see if automatic train operation is desired, and if so at block 806 a check is made to see if the vehicle has power, the doors are closed and the vehicle is not in an overspeed condition. At block 808 the reference is set to the input speed command from the track signal block minus two miles per hour. At block 810 a check is made to see if the doors are unlatched and if so at block 812 the program stop input is cleared and ignored. At block 814 the reference is set equal to zero because all of the auxiliary inputs are not correct. At block 816 the first difference speed DS1 is set equal to the reference REF minus the desired velocity RAMPS with limits of plus 5 and minus 6. At block 818 the first maximum acceleration AMAX1 is a function of the first difference speed DS1 and is the first acceleration 630 as determined by the address DS1 in the look up table ATBL2 and shown as 628 in FIG. 6. At block 820 the second difference speed DS2 is set equal to the program stop velocity VELPS minus the desired velocity RAMPS with a limit of plus 23 and minus 6. At block 822 the second acceleration AMAX2 is a function of the second difference speed DS2 and is the second acceleration 646 as determined by the address DS2 in the look up table ATBL3 and shown as 639 in FIG. 6 minus the nominal program stop offset 644. At block 824, the third difference speed DS3 is set equal to zero minus the program stop speed VELPS with limits of plus zero and minus 24. At block 826 the third acceleration AMAX3 is a function of the third difference speed DS3 divided by 4 as determined by the address DS3 in the look up table ATBL3 and shown as 650 in FIG. 6. At block 828 a check is made to see if the third acceleration AMAX3 is less than the second acceleration AMAX2 and if so at block 830 the fourth acceleration AMAX4 is said equal to the more positive or less negative second acceleration AMAX2. Otherwise at block 832 the fourth acceleration AMAX4 is set equal to the more positive or less negative third acceleration AMAX3. At block 834 a check is made to see if the fourth acceleration AMAX4 is greater than the first acceleration AMAX1, and if so at block 836 the fifth acceleration AMAX5 is set equal to the more negative or less positive first acceleration AMAX1. If not at block 838, then the fifth acceleration AMAX5 is set equal to the more negative or less positive fourth acceleration AMAX4. At block 840 the jerk limiter JERK1 is said equal to the difference between the fifth acceleration AMAX5 and the present value of desired acceleration ACC1 with limits of plus 5 and minus 12. At block 842 the desired acceleration ACC1 is set equal to the previous desired acceleration ACC1 plus the jerk limiter JERK1 to get the present desired acceleration, and the desired speed RAMPS is set equal to the previous desired speed plus the desired acceleration. At block 844 a check is made to see if the desired speed RAMPS is less than zero. If it is, at block 846 the desired speed is said equal to zero. At block 848, a check is made to see if the desired velocity RAMPS is greater than the program stop velocity VELPS, and if so at block 850 the desired velocity RAMPS is set equal to the program stop velocity VELPS. At block 852 a check is made to see if the vehicle actual speed plus 1.5 miles per hour is greater than the desired speed, and if it is at block 854 the desired speed is said equal to the actual speed plus 1.5 miles per hour.

Figure 8A:
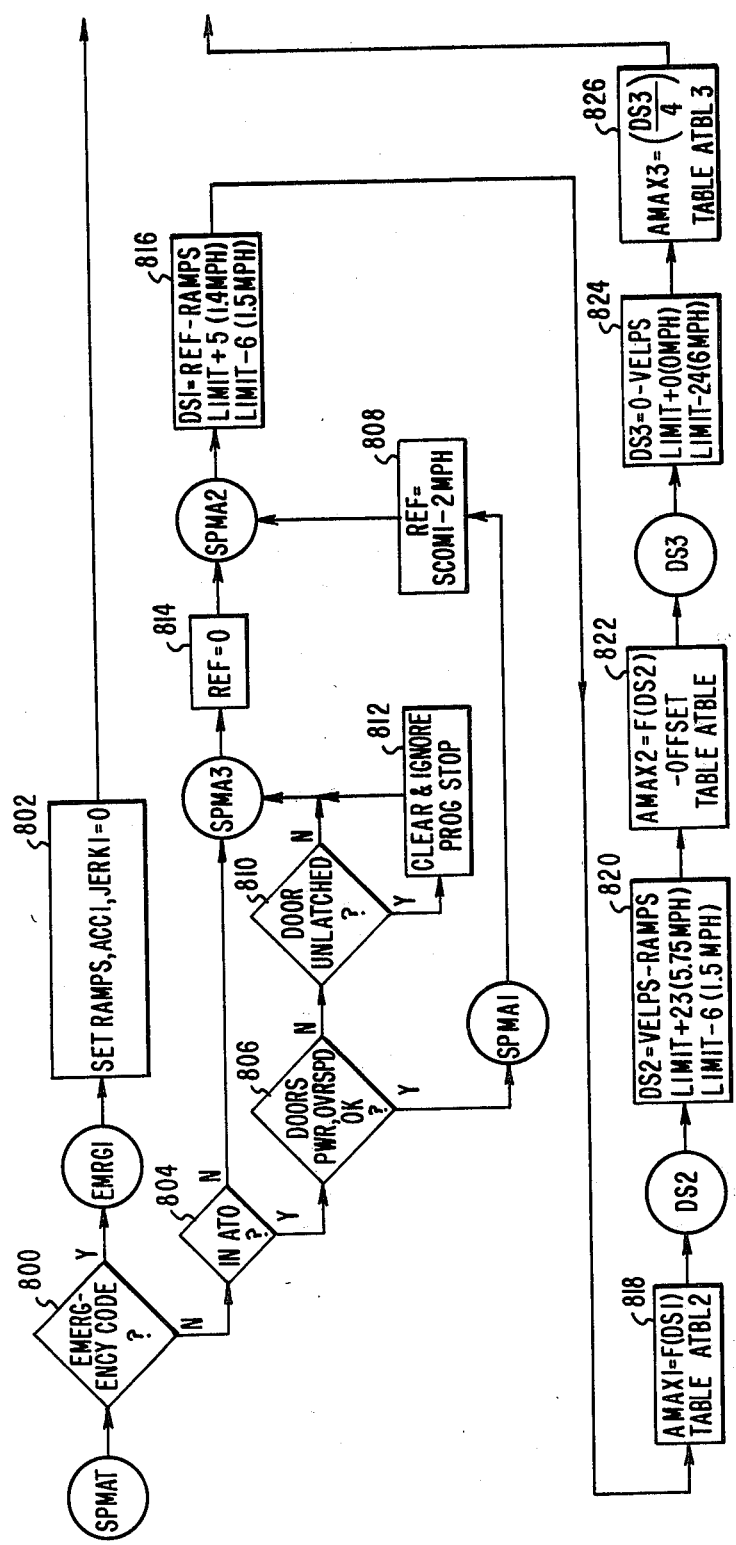
FIGS. 8A, 8B, 8C and 8D show a program flow chart to illustrate the operation of the present speed control apparatus.
Figure 8B:
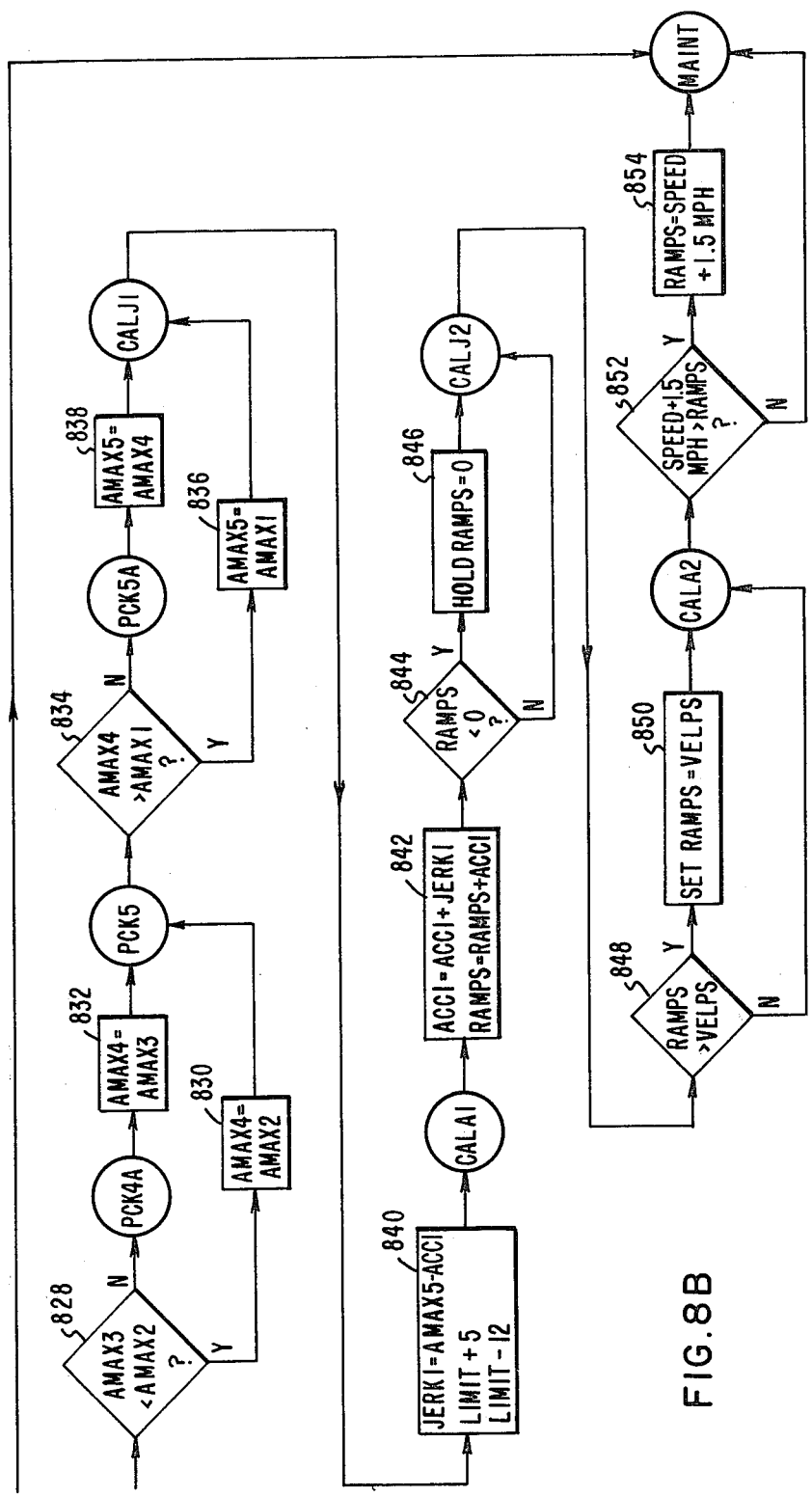
Figure 8C:
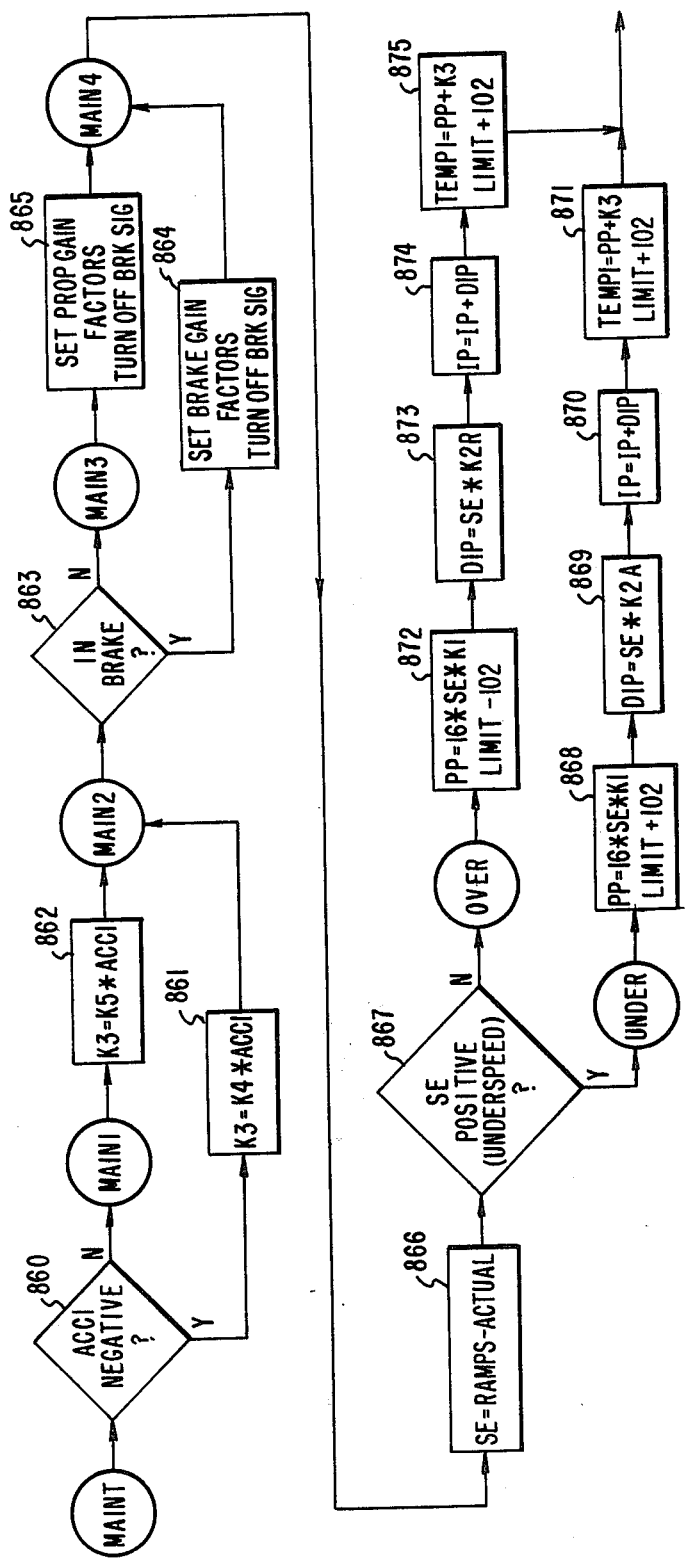
Figure 8D:
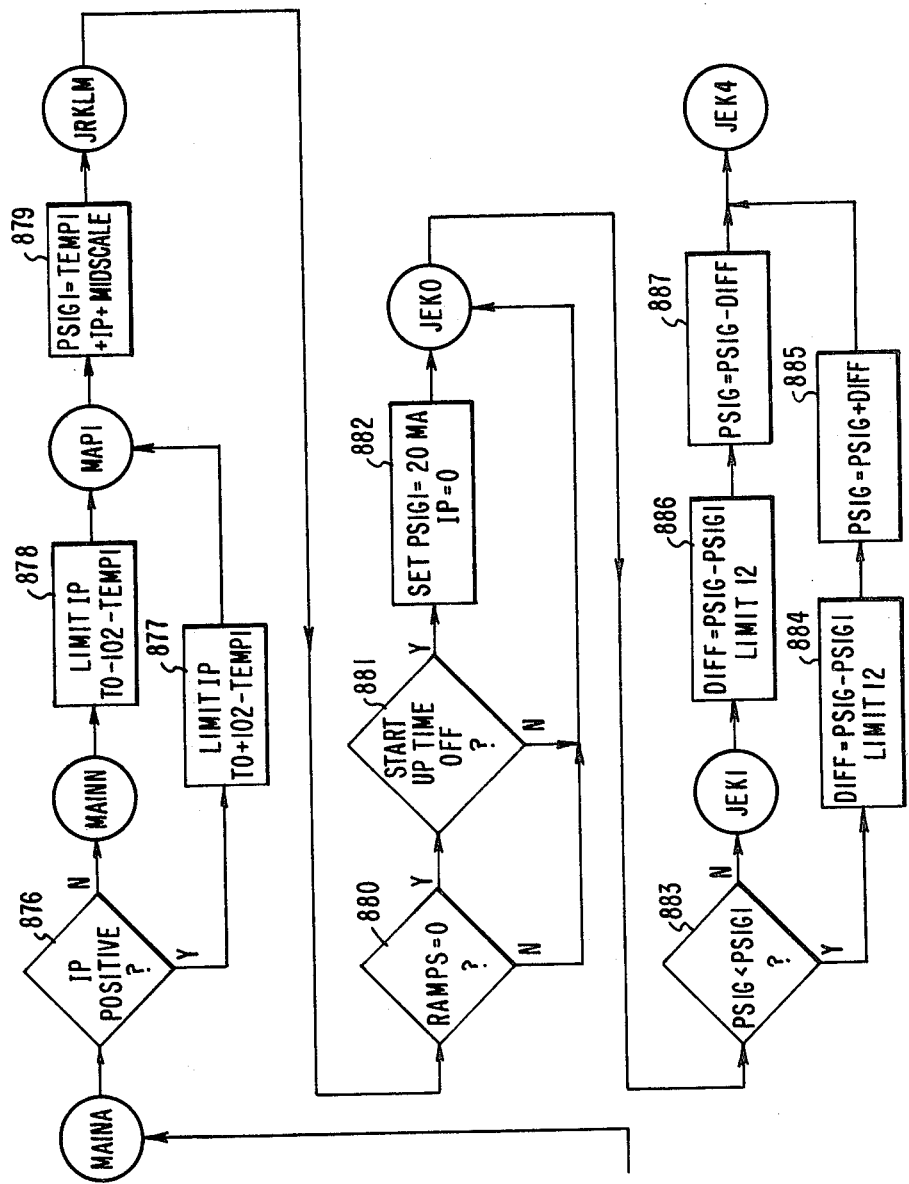

In the speed maintaining program flow chart shown in FIGS. 8C and 8D, at block 860 a check is made to see if the desired acceleration ACC1 is negative, and if so at block 861 the desired acceleration is multiplied by the brake system scale factor K4, and if not at block 862 the desired acceleration is multiplied by the propulsion system scale factor K5 to correct for the different operational characteristics of these two systems. At block 863 a check is made to see if the vehicle is in the brake mode, and if so at block 864 the proportional gain and integral gain for the brake PI controller are set and if not at block 865 these gain factors are set for the propulsion PI controller. At block 866 the speed error input for the PI controller 418 shown in FIG. 4 is calculated as the desired speed minus the actual speed. If the speed error is positive at block 867, then at block 868 the proportional part of the desired P signal is said equal to the speed error times the proportional gain term. At block 869 the change in the integral term is proportional to speed error. At block 870 the integral term is set equal to the old integral term plus the change in the integral term. At block 871 some limiting is provided to be sure the calculation does not go beyond the full scale limit of the P signal. The blocks 872 to 875 perform similar determinations in relation to a negative speed error or vehicle overspeed condition. At block 876 a check is made to see if the integral term is positive, and if so at block 877 the integral term is limited to the maximum value that will keep the P signal inside its limits. At block 878 a negative integral term is provided with this maximum value limit. At block 879 the P signal variable applied to the jerk limiter 423 in FIG. 4 is determined as the sum of the desired acceleration modified by the scale factor and the output of the PI controller and the addition of the 60 milliamps midscale point of the P signal. For the jerk limiter function at block 880 a check is made to see if the desired speed is zero. At block 881 if the startup time gate is off, the vehicle should be stopped so at block 882 the P signal is set at 20 milliamps and the integral term is set equal to zero. If the desired speed is not zero or the start up time gate is on when the desired speed is zero, the P signal should be its calculated value. At block 883 a check is made to see is the present P signal is less than the previous P signal, and if yes at block 884 the difference between these is determined with a limit provided. At block 885 the jerk limited P signal is said equal to the present P signal plus this difference. When the present P signal is greater than the previous P signal, block 886 determines the difference with a limit provided, and at block 887 the jerk limited P signal is set equal to the present P signal minus this difference. This jerk limited P signal corresponds with the output of the jerk limiter 423 shown in FIG. 4.

APPENDIX

A program listing, suitable for operation with an Intel 8080 microprocessor, is shown in the appendix, and functions in accordance with the program flow charts shown in FIGS. 8A, 8B, 8C and 8D. Included in this program listing are the tables ATBL2 and ATBL3, corresponding with the look up tables 628 and 639 respectively in FIG. 6, and the negative portion of the table ATBL3 coresponds with the look up table 650 in FIG. 6.

I claim:

1. In speed control apparatus for a transit vehicle having an actual speed signal and operative with a track having a speed command signal, the combination of
first means comprising an open loop acceleration controller for providing a predetermined desired acceleration signal in response to said speed command signal,
second means for providing a desired speed signal in response to said speed command signal,
third means comprising a closed loop speed controller for providing a speed control signal in response to the difference between said desired speed signal and said actual speed signal, and
fourth means responsive to the sum of said desired acceleration signal and said speed control signal for controlling the speed of said transit vehicle.

2. The speed control apparatus of claim 1, with said first means providing the desired acceleration signal in accordance with a maximum acceleration control signal established as a predetermined relationship to the difference between said speed command signal and said desired speed signal.

3. The speed control apparatus of claim 1 for a transit vehicle operative with a track having a program stop speed signal, and including
fifth means for providing a predetermined acceleration control signal in response to the program stop speed signal, and
with said first means being responsive to the acceleration control signal for providing the desired acceleration signal.

4. The speed control apparatus of claim 1, with said third means including a proportional plus integral controller to provide said speed control signal.

5. In speed control apparatus for a transit vehicle operative with a track supplying an input speed command signal, with said vehicle including a device for providing an actual speed signal, the combination of
first means for providing a first control signal in response to said input speed command signal and in accordance with a predetermined desired acceleration for said vehicle,
second means for providing a second control signal in response to said input speed command signal and in accordance with a predetermined desired speed for said vehicle,
third means comprising an open loop acceleration controller and being responsive to the first control signal for providing an open loop speed control of the transit vehicle, and
fourth means responsive to the actual speed signal and the second control signal and coupled with the third means for providing a modification of the speed control provided by the third means.

6. The speed control apparatus of claim 5 for a transit vehicle operative with a track supplying a program stop signal,
with said first means providing the predetermined desired acceleration in response to the selected one of said input speed command signal and the program stop signal that results in the less positive desired acceleration for the vehicle.

7. The speed control apparatus of claim 5 for a transit vehicle operative with a track supplying a second input speed command signal, including
fifth means for providing a third control signal in response to the second input speed command signal and in accordance with a second predetermined desired acceleration for said vehicle, and
with the third means being responsive to said third control signal and operative to select the one of the first control signal and the third control signal that results in the less positive acceleration of the vehicle.

8. The speed control apparatus of claim 5, with the fourth means providing a vernier modification of the speed control provided by the third means to compensate for at least one of track grades and operational friction of the vehicle moving along the track.

9. The method of controlling the speed of a trasit vehicle providing an actual speed signal and operative with a track having a speed command signal to determine the transit vehicle speed when moving along that track, including the steps of establishing a desired acceleration signal for the transit vehicle in accordance with a predetermined response to the speed command signal, establishing a desired speed signal for the transit vehicle having a predetermined relationship to the desired acceleration signal, controlling the change of speed of the transit vehicle along said track by an open loop response to the desired acceleration signal, and establishing a vernier modification of that speed change control by a closed loop response to the desired speed signal to compensate for the individual transit vehicle operational characteristics.

10. The method of claim 9, with the desired acceleration signal being established in relation to the difference between said desired speed signal and the speed command signal.

11. The method of claim 9 for a transit vehicle operative with a track providing a program stop signal to determine a desired stopping of that vehicle at a predetermined location along the track, with the desired acceleration signal being established in response to the selected one of the speed command signal and the program stop signal for providing the less positive maximum acceleration of the transit vehicle moving along the track.

12. The method of claim 9 for a transit vehicle operative with a track providing a program stop signal, with said step of establishing a desired acceleration signal including the steps of establishing a first maximum acceleration control signal in response to the speed command signal, establishing a second maximum acceleration controtl signal in response to the program stop signal, and establishing the desired acceleration signal in response to the less positive of the first and second maximum acceleration control signals.

* * * * *